United States Patent [19]

van der Linde et al.

[11] Patent Number: 5,076,900

[45] Date of Patent: * Dec. 31, 1991

[54] AMINOPLAST CONTAINING CATHODIC ELECTRODEPOSITION BATHS

[75] Inventors: Willem B. van der Linde, Cherry Hill, N.J.; Edward Chu, King of Prussia, Pa.

[73] Assignee: E. I. Du Pont de Nemours and Company, Wilmington, Del.

[*] Notice: The portion of the term of this patent subsequent to Dec. 25, 2007 has been disclaimed.

[21] Appl. No.: 531,326

[22] Filed: May 31, 1990

Related U.S. Application Data

[63] Continuation-in-part of Ser. No. 398,998, Aug. 28, 1989, abandoned.

[51] Int. Cl.$^5$ .................... C25D 13/06; C08G 8/28; C08L 61/00
[52] U.S. Cl. .................... 204/181.7; 523/414; 523/415; 523/416; 523/417; 523/424; 523/404; 525/526; 525/532
[58] Field of Search .................... 204/181.7; 523/414–417, 404, 424; 525/526, 532

[56] References Cited

U.S. PATENT DOCUMENTS

| | | | |
|---|---|---|---|
| 3,839,252 | 10/1974 | Bosso et al. | 204/181.7 |
| 3,937,679 | 2/1976 | Bosso et al. | 204/181.7 |
| 4,066,525 | 1/1978 | Woo et al. | 204/181.7 |
| 4,385,097 | 5/1983 | Isozaki et al. | 204/181.7 |
| 4,524,161 | 6/1985 | Feuerhahn | 523/414 |
| 4,537,805 | 8/1985 | Lin | 427/54.1 |
| 4,617,331 | 10/1986 | Boberski et al. | 204/181.7 |
| 4,647,604 | 3/1987 | Kempter et al. | 204/181.7 |
| 4,980,429 | 12/1990 | Chu | 525/511 |

*Primary Examiner*—John Niebling
*Assistant Examiner*—Steven P. Marquis
*Attorney, Agent, or Firm*—Hilmar L. Fricke

[57] ABSTRACT

A low cure cathodic electrodepositable resin is disclosed. The backbone of the resin is a polyepoxide amine adduct having primary or secondary hydroxyl groups which is crosslinked with aminoplast resins and catalyzed by metal catalysts. The resin is capable of curing in a basic environment at a temperature below 150° C. The resin can be salted with an acid and can be dissolved or dispersed in water. The aqueous dispersions can then be formulated into electrocoat primer coatings for metal objects.

26 Claims, No Drawings

AMINOPLAST CONTAINING CATHODIC ELECTRODEPOSITION BATHS

CROSS REFERENCE TO RELATED APPLICATION

This is a continuation-in-part of U.S. patent application Ser. No. 07/398,998, filed by the subject inventor on Aug. 28, 1989 now abandoned.

TECHNICAL FIELD

The field of art to which this invention pertains is electrodepositable compositions containing aminoplast resins (melamine-formaldehyde or urea-formaldehyde resins) as crosslinkers with metal catalysts to be used in cathodic electrocoat processes.

BACKGROUND ART

The coating of electrically conductive substrates by electrodeposition is a well known and important industrial process. (For instance, electrodeposition is widely used in the automotive industry to apply primers to automotive substrates). In this process, a conductive article is immersed as one electrode in a coating composition made from an aqueous emulsion of film-forming polymer. An electric current is passed between the article and a counter-electrode in electrical contact with the aqueous emulsion, until a desired coating is produced on the article. Early electrodeposition was conducted with the article to be coated serving as the anode. This was familiarly referred to as anodic electrodeposition. Currently, the article to be coated typically serves as the cathode in the electrical circuit with the counter-electrode being the anode. This is known as cathodic electrodeposition.

Resin compositions used in cathodic electrodeposition baths are also well known in the art. These resins are usually manufactured from polyepoxide resins which have been chain extended and adducted to include a nitrogen atom. The nitrogen is typically introduced through reaction with an amine compound Normally these resins are blended with a crosslinking agent and then neutralized with an acid and dispersed in water to form an emulsion which is usually referred to as a principal emulsion.

The principal emulsion is combined with a pigment paste, coalescent solvents, water, and other additives to form the electrodeposition bath. The electrodeposition bath is placed in an insulated tank containing the anode. The article to be coated is made the cathode and is passed through the tank containing the electrodeposition bath. The thickness of the coating is a function of the bath characteristics, the electrical operating characteristics, the immersion time, and so forth.

The coated object is removed from the bath after a fixed period of time (normally about two or three minutes). The object is rinsed with deionized water and the coating is cured, typically in an oven at sufficient temperature to produce crosslinking.

The curing agents for anodic electrodepositable resins were usually aminoplasts or phenolplasts since these cure quite successfully. However, it was initially found that the aminoplasts were not completely satisfactory for use in cathodic electrodeposition. This is because aminoplasts cure best in an acidic environment. With anodic electrodeposition, this poses no problem since the anodically electrodeposited coating is acidic. However, the cathodically electrodeposited coating is basic and relatively high temperatures, that is, about 400° F. (204° C.) or higher must be used for complete curing of the cathodically electrodeposited coating.

Attempts have been made to overcome this problem by utilizing an acid-functional aminoplast as crosslinker with the hydroxyl containing amino epoxy resin (U.S. Pat. No. 4,066,525). However, this approach has not been found to be satisfactory because a high cure temperature of over 175° C. is required. Other approaches include using quaternary onium salt-containing resins in combination with an aminoplast or a methylol-phenol ether (U.S. Pat. No. 3,937,679) disclosing 204° C. cure tempearature. U.S. Pat. No. 4,501,833 also discloses quaternary onium salt containing resins in combination with high imino functional aminoplasts. While the '833 patent discloses relatively low cure temperature, we have found performance is not satisfactory because the coated film is rough and too thin.

Another approach is disclosed in U.S. Pat. No. 4,363,710 utilizing a resin with primary amino functionality and a melamine/formaldehyde crosslinker, catalyzed with a phenolic blocked phosphoric acid ester. However this system shows only very high temperature cure (180° C. or above for 20 minutes).

There is a need for a cathodic electrodeposition process using aminoplasts which will give a good smooth coating and yet cure at low temperatures in a basic environment. We have found that an aminoplast system will cure at low temperatures (120° to 150° C.) in a basic environment (i.e. cathodic system) if catalyzed by metal catalysts. The metal catalysts are metal salts of both organic acid salts or inorganic acid salts such as Cu, Fe, Mn, Co, Pb, Bi, Zn and Sn octoate and napthanate. As stated above, this result is very surprising, as it was previously thought that aminoplast resins would only cure in an acid environment (anodic system) at these relatively low temperatures.

Metal catalysts are known in the art to catalyze certain coating compositions but metal catalysts are not known to cure aminoplasts. Prior art references teach the use of metal catalysts for the following: alkyd oxidative cure (U.S. Pat. No. 4,495,327); in an electrocoat system for transesterification (U.S. Pat. No. 4,352,842 and U.S. Pat. No. 4,644,036); and in electrocoat systems for transamidation (U.S. Pat. No. 4,477,530). There is nothing in the prior art to suggest their use to catalyze the reaction of aminoplast resins.

The novel resin of this invention is not restricted to cathodic electrodeposition. It also could be used in non-electrocoat applications such as spray applications, roller coating, dip applications, and so forth.

SUMMARY OF THE INVENTION

In accordance with the present invention, a novel, improved cathodic electrodeposition coating composition is disclosed using aminoplast resins. More specifically, our coating composition comprises a typical polyepoxy resin with primary or secondary hydroxy functionality crosslinked with aminoplasts (e.g. melamine/formaldehyde or urea-formaldehyde). The polyepoxy resin and the crosslinker are catalyzed by metal catalysts. The novel composition provides a smooth coating with good top coat adhesion and corrosion resistance which will cure at 135° C. It is also expected that the cure temperature could be as low as 120°C.

DETAILED DESCRIPTION

The amino functional backbone resin which is used in the practice of this invention is typically obtained by reacting polyepoxide resins with nitrogen containing compounds such that the resin becomes amino functional. The resin of our invention must contain either primary or secondary hydroxy functionality and most preferably primary hydroxy functionality. (Copending application Ser. No. 07/301,472, filed Jan. 26, 1989, describes a related invention where the backbone resin contains either primary or secondary amino functionality. In addition, an application filed concurrent herewith, entitled "Phenolplast Containing Cathodic Electrodeposition Baths", discloses similar electrocoat resins crosslinked with phenolplasts).

The polyepoxide resins which are used to make the hydroxyl functional resins are well known in the art.

The polyepoxide resins which are used in the practice of the invention are polymers having a 1,2-epoxy equivalency greater than one and preferably about two, that is, polyepoxides which have on an average basis two epoxy groups per molecule. The preferred polyepoxides are polyglycidyl ethers of cyclic polyols. Particularly preferred are polyglycidyl ethers of polyhydric phenols such as bisphenol A. These polyepoxides can be produced by etherification of polyhydric phenols with epihalohydrin or dihalohydrin such as epichlorohydrin or dichlorohydrin in the presence of alkali. Examples of polyhydric phenols include the following:
2,2-bis-(4-hydroxy-3-tertiarybutylphenyl)propane;
1,1-bis-(4-hydroxyphenyl)ethane;
2-methyl-1,1-bis-(4-hydroxyphenyl) propane;
2,2-bis-(4-hydroxy-3-tertiarybutylphenyl)propane;
bis-(2-hydroxynaphthyl) methane;
1,1-bis-(4-hydroxyphenyl) propane;
5-dihydroxy-3-naphthalene or the like.

Besides polyhydric phenols, other cyclic polyols can be used in preparing the polyglycidyl ethers of cyclic polyol derivatives. Examples of other cyclic polyols would be alicyclic polyols, particularly cycloaliphatic polyols, such as 1,2-cyclohexanediol, 1,4-cyclohexanediol, 1,2-bis(hydroxymethyl)cyclohexane, 1,3-bis-(hydroxymethyl)cyclohexane and hydrogenated bisphenol A.

The polyepoxides have number average molecular weights (Mn) of at least 200 and preferably within the range of 200 to 2000, and more preferably about 340 to 2000.

The polyepoxides are preferably chain extended with a polyether or a polyester polyol which increases rupture voltage of the composition and enhances flow and coalescence. Examples of polyether polyols and conditions for chain extension are disclosed in U.S. Pat. No. 4,468,307, column 2, line 67, to column 4, line 52, the portions of which are hereby incorporated by reference. Examples of polyester polyols for chain extension are disclosed in U.S. Pat. No. 4,148,772, column 4, line 42, to column 5, lines 53, the portions of which are hereby incorporated by reference.

In addition to the polyepoxide backbone resin, this invention would also be applicable to acrylic, polybutadiene, polyester or phenolic resins which contain hydroxy functionality.

The polyepoxy amine resin of our invention must contain primary or secondary hydroxy functionality. This hydroxy functionality is usually imparted by reacting the epoxy group with secondary amines containing one or more primary hydroxyl groups. Examples of hydroxyl containing secondary amines include diethanol amine, methylethanol amine, ethylethanol amine, and so forth. Additional ways of imparting hydroxy functionality to the backbone resin include primary and/or tertiary amines containing primary hydroxyl groups. Examples include ethanol amine, and triethanol amine. The preferred method of imparting the hydroxy functionality to the backbone resin is the use of the secondary amine containing one or more primary hydroxy groups. This method is illustrated in our example section and also by Example I(b) of U.S. Pat. No. 4,397,990 (column 10) which is incorporated herein by reference.

The crosslinkers in this invention are aminoplast resins. The aminoplast resins must have either a high imino content or a high methylol content (or a mixture thereof) and also a low water solubility. The sum of the imino functional groups and methylol functional groups must be at least 20 percent and preferably 30 percent of the total available functional sites on the aminoplast resin. A commercial example of such an aminoplast resin is Cymel 1158 ®.

Furthermore an aminoplast resin that is to be used in electrodeposition must be substantially water insoluble in order to ensure codeposition with the electrocoat backbone resin. At least 50 percent or more and preferably 75 percent or more of the aminoplast resin must partition into the discrete phase (the discrete phase contains the back-bone resin, pigments, heavy metal catalyst and additives). The aminoplast resin must be at least about as water insoluble as Cymel 1158 ®.

Melamine-formaldehyde resins having either a high imino content or a high methylol content (or a mixture thereof) and also a low water solubility are commercially from the Monsanto Company under the trademark Resimene ® and from American Cyanamid under the trademark Cymel ®. Our preferred aminoplast is one which contains high imino groups such as Cymel ® 1158. It is also possible to use partially alkylated resins containing methylol groups. Less preferred are highly alkylated aminoplasts such as Cymel ® 300 and Cymel ® 1160. In addition, carboxyl modified amino resins such as the Cymel ® 1100 resins (specifically Cymel ® 1141 and Cymel ®1125) could be utilized in the invention. These carboxyl modified amino resins must also be substantially water insoluble and have the imino content and/or methylol content described above for other aminoplast resins.

Another type of aminoplast resin which can be used as the crosslinker are urea-formaldehyde resins. These resins are commercially available from American Cynamide Co. under the tradename Beetle ®. These resins are also chosen according to the degree of alkylation desired. The urea-formaldehyde resins must also be substantially water insoluble and have the imino content and/or methylol content described above for other aminoplast resins. The preferred urea-formaldehyde resins are ones which contain methylol groups such as Beetle ® 55, 60, or 65. Less preferred are urea-formaldehyde resins which are highly alkylated such as Beetle ® 80.

The metal catalysts of our invention are metal salts of both organic acids or inorganic acids, or coordination compounds of these metals. Organic acid salts are more desirable, particularly organic acid salts that are compatible with the resin compositions and that are water insoluble. These usually are metallic soaps of monocarboxylic acids containing 7 to 22 carbon atoms.

The metals used in the catalyst are iron, lead, lithium, potassium, sodium, calcium, magnesium, beryllium, aluminum, zinc, cadmium, barium, scandium, gallium, indium, tin, vanadium, manganese, molybdenum, tellurium, silver, copper, nickel, cobalt, chromium, palladium and so forth.

Our preferred catalysts are Co, Cu, Fe and Pb octoates or napthenates. These catalysts are commercially available from Huls American Inc. under the tradenames Nuodex ® or Nuxtra ®. It is also possible to use chelates of these metals as catalysts, such as coordination compounds or complexes of the metal with Lewis bases or ligands. Our preferred chelate is cobalt acetylacetonate.

The hydroxy functional resin and the aminoplast crosslinker are the principal resinous ingredients in the electrocoating composition. They are usually present in a ratio of backbone resin to crosslinker of about 40/60 to 95/5 percent by weight of solids. Preferably, the ratio is 85/15 to 65/35 backbone resin to crosslinker. The metal catalyst is typically present in amounts of about 0.1 to 5.0 percent metal on weight of total resin solids. Preferably, the metal catalyst is present from 0.5 to 1.5 percent metal on weight of total resin solids.

Besides the resinous ingredients described above, the electrocoating compositions usually contain a pigment which is incorporated into the composition in the form of a paste. The pigment paste is prepared by grinding or dispersing a pigment into a grinding vehicle and optional ingredients such as wetting agents, surfactants and defoamers. Pigment grinding vehicles are well known in the art. After grinding, the particle size of the pigment should be as small as practical, generally a Hegman grinding gauge of about 6 to 8 is usually employed.

Pigments which can be employed in the practice of the invention include titanium dioxide, basic lead silicate, strontium chromate, carbon black, iron oxide, clay and so forth. Pigments with high surface areas and oil absorbencies should be used judiciously because they can have an undesirable effect on coalescence and flow.

The pigment-to-resin weight ratio is also fairly important and should be preferably less than 0.5:1, more preferably less than 0.4:1, and usually about 0.2 to 0.4:1. Higher pigment-to-resin solids weight ratios have also been found to adversely affect coalescence and flow.

The coating composition of the invention can contain optional ingredients such as plasticizers, wetting agents, surfactants, defoamers and so forth. Examples of surfactants and wetting agents include alkyl imidazolines such as those available from Ciba-Geigy Industrial Chemicals as Amine C ®, and from Air Products Corporation as Surfynol 104 ®. These optional ingredients, when present, constitute from about 0 to 20 percent by weight of total resin solids. Plasticizers are preferred optional ingredients because they promote flow. Examples are high boiling water immiscible materials such as ethylene or propylene oxide adducts of nonyl phenols or bisphenol A. When plasticizers are used, they are used in amounts of about 0.5 to 10.0 percent by weight of total resin solids.

The electrodepositable coating compositions of the present invention are dispersed in aqueous medium. The term "dispersion" as used within the context of the present invention is believed to be a two-phase translucent or opaque aqueous resinous system in which the resin is in the dispersed phase and water the continuous phase. The average particle size diameter of the resinous phase is about 0.1 to 5.0 microns, preferably less than 1 micron The concentration of the resinous products in the aqueous medium is, in general, not critical, but ordinarily the major portion of the aqueous dispersion is water. The aqueous dispersion usually contains from about 3 to 75, typically 5 to 50 percent by weight of total resin solids. Aqueous resin concentrates which are to be further diluted with water at the job site generally range from 30 to 75 percent by weight of total resin solids. Fully diluted electrodeposition baths generally have resin solids content of about 3 to 25 percent by weight of total resin solids.

Besides water, the aqueous medium may also contain a coalescing solvent. Useful coalescing solvents include hydrocarbons, alcohols, esters, ethers and ketones. The preferred coalescing solvents include alcohols, polyols and ketones. Specific coalescing solvents include butanol, 2-ethylhexanol, 4-methoxy-2-pentanone, ethylene and propylene glycol and the monoethyl, monobutyl, monohexyl and 2-ethylhexyl ethers of ethylene glycol. The amount of coalescing solvent is not unduly critical and is generally between about 0 to 15 percent by weight, preferably about 0.5 to 5 percent by weight based on total weight of the aqueous medium.

EXAMPLES

Example I

Preparation of an Amino Epoxy Resin Containing Hydroxy Functionality

A primary hydroxy containing resin was prepared according to U.S. Pat. No. 4,397,990 Column 10, Example I(b) as described immediately below.

To a solution of epoxy resin Epon ® 1001 (289.2 gms; 0.6 epoxy equivalent) in ethylene glycol monobutyl ether (161 gms) were added diethanol amine (21.0 gms; 0.2 mole), 3-(N,N-Dimethyl amino) 1,6-Diamino hexane and Cardura E-10 ® (61.6 gms; 0.1 mole of adduct). (Cardura E-10 ® is a glycidyl ester of $C_{10}$ acid available from Shell Chemical Company). This adduct had been prepared by reacting 1,6-diamino hexane (116, gms; 1 mole) with Cardura E-10 ® (500 gms; 2 moles) at 80° C. for 3 hours. The mixture of the epoxy resin Epon ® 1001 and the amines was reacted by heating first at 85°-90° C. for 4 hours with stirring, and then at 120° C. for 1 hour. The epoxy content was then zero. Amine milliequivalent per gm. solid = 1.57; hydroxy content of 0.47 equivalent/100 gms.

Example II

Example II demonstrates that curing of the basic amino epoxy resin having hydroxy functionality with an aminoplast is possible when catalyzed with a metal catalyst. Drawdowns were made of the compositions listed in Table I.

TABLE I

| Compounds Solids | A | B | C |
|---|---|---|---|
| Resin (from Ex I) (70% solids in butoxyethanol) | 15.4 | 15.4 | 15.4 |
| Cymel 1158 ® (80% solids in butanol) | 3.1 | 3.1 | 3.1 |
| Cobalt Octoate 12% Co | — | 1.1 | — |
| Lead Octoate 24% Pb | — | — | 0.5 |
| Methoxypropanol | 7.0 | 7.0 | 7.3 |
| Methylethylketone (MEK) | 7.4 | 7.0 | 7.3 |
| Total | 32.9 | 33.6 | 33.6 |

TABLE I-continued

| Bake: | Cure Measured as MEK Double Rubs | | |
|---|---|---|---|
| 30 min at 136° C. | ~10 | >100 | <100 |
| 30 min at 149° C. | ~30 | >100 | 100 |
| 30 min at 163° C. | ~50 | >100 | >100 |

It is clear from Table I that formulation (A) without metal catalyst does not cure, while formulation (B) with cobalt octoate cures at 30 min at 136° C. and formulation (C) with lead octoate cures at 30 min at 149° C.

Example III

Aqueous dispersions based on the amino epoxy resin from Example I were evaluated as electrodeposition paints. 457.1 grams of epoxy resin was mixed with 100 grams of Cymel 1158 ® melamine crosslinker. Catalysts as well as lactic acid for partial neutralization of the amino groups were added prior to dispersion in water as shown in Table II. The solids were adjusted to 20% with water. Coatings were applied by cathodic electrodeposition on steel panels and baked at different temperatures. The degree of cure was determined by methyl-ethylketone (MEK) double rubs.

TABLE II

| Cathodic Electrodeposition Formulations | | | |
|---|---|---|---|
| Ingredients | D | E | F |
| Resin (from Ex I) (70% solids in butoxyethanol) | 457.1 | 457.1 | 457.1 |
| Cymel 1158 ® (80% in butanol) | 100.0 | 100.0 | 100.0 |
| Cobalt Octoate 12% Co | 33.3 | | |
| Cobalt Acetylacetonate 22.8% Co | | 17.5 | |
| Pb Octoate 24% Pb | | | 33.3 |
| Lactic Acid (88% in water) | 26.6 | 26.6 | 26.6 |
| Deionized Water | 1348.0 | 1363.8 | 1364.7 |
| | 1965.0 | 1965.0 | 1999.7 |

Table III gives the curing properties (as determined by MEK double rubs) of the electrocoated paint.

TABLE III

| | | MEK Double Rubs at Various Bake Temperatures for 30 Min | | |
|---|---|---|---|---|
| Composition | Thickness | 130° C. | 149° C. | 163° C. |
| D | 18-23 microns | >100 | >100 | >100 |
| E | 20-27 microns | 100 | >100 | >100 |
| F | 27-37 microns | 50 | 100 | >100 |

Example IV

Preparation of Hydroxyl Functional Amino Epoxy Backbone Resins (Similar to Example I)

(a) Preparation of Amine Intermediates

An adduct of diamine with Cardura E-10 ® is used as an intermediate for the preparation of the backbone resin with hydroxyl functionality, according U.S. Pat. Nos. 4,397,990 and 4,401,774 and as described below.

Table IV gives various compositions of amine intermediate. Either 1,6-hexane diamine or 1,5-diamino-2-methyl pentane was charged to a 2-liter, three-neck reaction flask equipped with agitator, condenser, cold water bath, thermometer and heating mantle. The batch was heated to 80°-90° C. and the heat was turned off. Cardura E-10 ® was charged to a graduated addition funnel and slowly added to the batch while the batch temperature was held at 100°-110° C. for about one to two hours. After all the Cardura E-10 ® was added, the batch was continued to be held at 110° C. until the epoxy content was zero and the amine milli-equivalent per gram of solids was equal to or less than 3.30. Then the batch was either cooled to 60° C. and packaged for later use or reduced to 60% solids with ethyleneglycol monobutylether and packaged.

TABLE IV

| | AMINE INTERMEDIATES | | | |
|---|---|---|---|---|
| INGREDIENTS | K CHARGE | L CHARGE | M CHARGE | N CHARGE |
| I 1,6-Hexane diamine | 147.1 | — | 205 | — |
| 1,5-diamino-2-methylpentane | — | 161.0 | — | 247.6 |
| II Cardura E-10 ® | 634.2 | 619.0 | 888 | 1050.0 |
| III Ethylene glycol monobutylether | 518.7 | 520.0 | — | — |
| | 1300.0 | 1300.0 | 1093 | 1297.6 |

(b) Preparation of hydroxy functional resins

As shown in Table V, epoxy resin (either Epon 1001 ® or DER-671-T-75 ®) was charged along with (first portion) solvent to a five-liter three-neck reaction flask equipped with agitator, condenser, cold water bath, thermometer and heating mantle. The mixture was heated up to 110° C. until all the epoxy resin was dissolved in the case of Epon 1001 ®. (DER-671-T-75 ® is already in solution). The batch was cooled to 60° C. with the cold water bath. Diethanolamine was added slowly (about 10 mins) and the batch was held at 60°-70° C. until the milli-equivalent of combined epoxy and amine per gram solution was between 1.34 to 1.43. Then the dimethylaminopropylamine, an amine intermediate (from Table IV) and (second portion) solvent were added and the batch temperature was held at 80° C. for one hour. The batch temperature was raised to 120° C. and was held for at least one more hour. In formulations O and P, 500.0 grams of solvent was stripped off. When the milli-equivalent of combined epoxy and amine per gram solution was between 1.13 to 1.09, the batch was cooled to 60° C. and packaged.

TABLE V

| | COMPOSITION OF HYDROXYL CONTAINING RESIN | | | | |
|---|---|---|---|---|---|
| INGREDIENTS | O CHARGE | P CHARGE | Q CHARGE | R CHARGE | S CHARGE |
| DER 671-T-75[1] | 2110.2 | 2110.2 | — | — | — |
| Epon 1001[2] | — | — | 1589.9 | 1589.9 | 467.0 |
| Ethylene Glycol Monobutyl ether (Portion 1) | 144.5 | 144.5 | 675.1 | 675.1 | — |

TABLE V-continued

| | COMPOSITION OF HYDROXYL CONTAINING RESIN | | | | |
|---|---|---|---|---|---|
| INGREDIENTS | O CHARGE | P CHARGE | Q CHARGE | R CHARGE | S CHARGE |
| Propylene Glycol Monomethyl ether (Portion 1) | — | — | — | — | 311.3 |
| Diethanol Amine | 114.9 | 114.9 | 115.5 | 115.5 | 310.6 |
| Dimethylamino-Propylamine | 55.8 | 55.8 | 56.1 | 56.1 | 14.5 |
| Amine Intermediate L (Table VII) | 574.6 | — | — | — | — |
| Amine Intermediate N (Table VII) | — | — | — | 338.6 | — |
| Amine Intermediate K (Table VII) | — | 560.9 | — | — | — |
| Amine Intermediate M (Table VII) | — | — | 338.6 | — | 87.9 |
| Ethylene Glycol Monobutyl ether (Portion 2) | 500.0 | 500.0 | 224.8 | 224.8 | |
| Propylene Glycol Monomethyl ether (Portion 2) | — | — | — | — | 88.7 |
| Solvent Removed by Stripping | −500.0 | −500.0 | — | — | |
| | 3000.0 | 2986.3 | 3000.0 | 3000.0 | 1000.0 |

(1) Epoxy resin from Dow Chemical Co. formed from reacting Bisphenol A and Epichlorohydrin and reduced to 75% solids with Toluene.
(2) Epoxy resin from Shell Chemical Co. formed from reacting Bisphenol A and Epichlorohydrin having epoxy equivalent weight of 534.8.

Example V

Preparation of Another Type of Amino-Epoxy Resin with Hydroxyl Functionality Table VI shows compositions of other types of hydroxyl containing resins. The preparation was as follows:

The Synfac 8105 ® (diglycidyl ether of propoxylated bisphenol A from Milliken Chemical Company), bisphenol A, solvent and diethanolamine (first portion) were charged to a reaction vessel and heated with a nitrogen purge to 130° C. After an exotherm, the batch was held at 150° C. for about two hours until the milliequivalent of combined amine and epoxy per gram solution was equal or less than 0.2. The batch was cooled to 120° C. and DER-361 ® (diglycidyl ether of epichlorohydrin and bisphenol A from Dow Chemical) and second portion of diethanol amine were added and held at 120° C. until the milliequivalent of the combined amine and epoxy per gram solution was between 1.12 to 1.21. The batch was then diluted with propylene glycol monomethyether and/or ethylene glycol monobutylether and cooled to 80° C. The diethanolamine (third portion) was added and held at 80° C. for one hour, followed by the addition of dimethylaminopropylamine. The batch was held for another hour at 80° C. Then the batch temperature was raised to 120° C. and held for at least one hour until the epoxy content was zero. After the addition of methyl iso-butyl ketone, the batch was cooled to 60° C. and packaged.

TABLE VI

| | COMPOSITIONS OF OTHER TYPE OF HYDROXYL CONTAINING RESIN | |
|---|---|---|
| INGREDIENT | T CHARGE | U CHARGE |
| Synfac 8105 ® | 351.0 | 380.9 |
| Bisphenol A | 373.1 | 222.5 |
| Toluene | 18.5 | 12.2 |
| Diethanolamine (first portion) | 13.1 | 4.7 |
| DER-361 ® | 523.4 | 380.9 |
| Diethanolamine (second portion) | 5.4 | 4.4 |
| Propyleneglycol monomethyl ether | 206.9 | 249.0 |
| Ethyleneglycol monobutyl ether | 113.0 | — |
| Diethanolamine (third portion) | 51.1 | 48.7 |
| Dimethylamino-propylamine | 49.7 | 47.2 |
| Methyl iso-butyl ketone | 247.7 | 325.3 |
| | 1952.9 | 1675.8 |

Example VI

Cure Test for Resins of Table V and VI with Melamine-Formaldehyde Crosslinker The resins of Table V and Table VI were mixed with Cymel 1158 ® as shown in Table VII. Lead octoate or cobalt acetylacetonate were used as the catalyst. The formulations were coated on steel panels by drawdown with a doctor blade and baked at different temperatures. The cure was tested with MEK doublerubs. As shown in Table VII all formulations were cured with a 30 minute bake at 149° C. Those formulations containing cobalt acetylacetonate cured with a 30 minute bake at 135° C.

TABLE VII

| FORMULATION | \multicolumn{14}{c}{CURE STUDY} |
|---|---|---|---|---|---|---|---|---|---|---|---|---|---|---|
| | $V_1$ | $V_2$ | $W_1$ | $W_2$ | $X_1$ | $X_2$ | $Y_1$ | $Y_2$ | $Z_1$ | $Z_2$ | $AA_1$ | $AA_2$ | $BB_1$ | $BB_2$ |
| Resin | | | | | | | | | | | | | | |
| O | 25.3 | 25.3 | | | | | | | | | | | | |
| P | | | 25.3 | 25.3 | | | | | | | | | | |
| Q | | | | | 25.3 | 25.3 | | | | | | | | |
| R | | | | | | | 25.3 | 25.3 | | | | | | |
| S | | | | | | | | | 27.6 | 27.6 | | | | |
| T | | | | | | | | | | | 25.3 | 25.3 | | |
| U | | | | | | | | | | | | | 23.3 | 23.3 |
| Crosslinker | | | | | | | | | | | | | | |
| Cymel 1158 ® | 6.3 | 6.3 | 6.3 | 6.3 | 6.3 | 6.3 | 6.3 | 6.3 | 6.3 | 6.3 | 6.3 | 6.3 | 6.3 | 6.3 |
| Additives | | | | | | | | | | | | | | |
| Synfac 8029 ® | 0.7 | 0.7 | 0.7 | 0.7 | 0.7 | 0.7 | 0.7 | 0.7 | 0.7 | 0.7 | 0.7 | 0.7 | 0.7 | 0.7 |
| Methoxy propanol | 10.0 | 10.0 | 10.0 | 10.0 | 10.0 | 10.0 | 10.0 | 10.0 | 10.0 | 10.0 | 10.0 | 10.0 | 10.0 | 10.0 |
| MEK | 14.7 | 14.7 | 14.7 | 14.7 | 14.7 | 14.7 | 14.7 | 14.7 | 14.7 | 14.7 | 14.7 | 14.7 | 14.7 | 14.7 |
| Pb Octoate 24% Pb | 1.5 | | 1.0 | | 1.5 | | 1.5 | | 1.5 | | 1.5 | | 1.5 | |
| Cobalt acetylacetonate 24% Co | | 1.5 | | 1.2 | | 1.5 | | 1.5 | | 1.5 | | 1.5 | | 1.5 |
| 30 MIN BAKE: | \multicolumn{14}{c}{MEK DOUBLE RUBS} |
| 120° C. | | 100 | | 80 | | | | | | | | | | |
| 135° C. | failed | | 30 | | 85 | 100 | 38 | 100 | 100 | >100 | 100 | 100 | <100 | >100 |
| 149° C. | >100 | >100 | >100 | >100 | 100 | >100 | 100 | >100 | 100 | >100 | | 100 | 100 | >100 |

Example VII

Cationic Electrocoat Dispersions

Dispersions were made of some of the formulations described in Table VII. Table VIII shows the different cationic electrocoat formulations. The ingredients were added in order, with agitation and then dispersed in deionized water.

The scab corrosion test results indicated that the formulations containing cobalt acetylacetonate baked at 120° C. for 30 minutes as well as 149° C. for 30 minutes have excellent corrosion resistance on bare steel as well as zinc phosphate treated steel. The formulation containing lead octoate had excellent corrosion performance on bare steel but marginal performance on zinc phosphated steel.

TABLE VIII

| FORMULATION | $CC_1$ | $CC_2$ | $DD_1$ | $DD_2$ | $EE_1$ | $EE_2$ | $FF_1$ | $FF_2$ |
|---|---|---|---|---|---|---|---|---|
| Resin O | 411.6 | 411.6 | | | | | | |
| Resin P | | | 384.2 | 384.2 | | | | |
| Resin Q | | | | | 405.2 | 405.2 | | |
| Resin R | | | | | | | 411.6 | 411.6 |
| Cymel 1158 ® | 89.8 | 89.8 | 89.8 | 89.8 | 89.8 | 89.8 | 89.8 | 89.8 |
| Synfac 8029 ® | 15.6 | 15.6 | 15.6 | 15.6 | 15.6 | 15.6 | 15.6 | 15.6 |
| Pb Octoate 24% Pb | 16.3 | | 16.3 | | 16.3 | | 16.3 | |
| Cobalt acetylacetonate 22% Co | | 19.5 | | 19.5 | | 19.5 | | 19.5 |
| Lactic Acid (88% in water) | 16.0 | 16.0 | 16.0 | 16.0 | 23.6 | 23.6 | 23.6 | 23.6 |
| Deionized water | 1452.0 | 1452.0 | 1452.0 | 1452.0 | 1452.0 | 1452.0 | 1452.0 | 1452.0 |
| | 2001.3 | 2004.5 | 1973.9 | 1977.1 | 2002.5 | 2005.0 | 2008.9 | 2012.1 |
| MEK DOUBLE RUBS BAKE: | | | | | | | | |
| 30 mins at 120° C. | | 100 | | 80 | | | | |
| 30 mins at 135° C. | 30 | | 30 | | 85 | 100 | 19 | 100 |
| 30 mins at 149° C. | 100 | 100 | 100 | 100 | 100 | 100 | 100 | 100 |

The dispersions were electrocoated on steel panels, tested for cure at different baking temperatures, and tested for corrosion protection by subjecting the panels to the GM "SCAB" test. The cure responses of the cationic electrocoat formulations in Table XI were analogous to the results of those obtained in the draw down film (Table VII). The cationic electrocoat formulations all cured at 149° C. for 30 minute bake. Those with cobalt acetylacetonate cured at 135° C. for 30 minute bake.

I claim:
1. A cathodic electrodepositable resin comprising:
   (a) a polyepoxide amine adduct having primary or secondary hydroxyl groups;
   (b) a melamine-formaldehyde crosslinker; the melamine-formaldehyde being substantially water insoluble and having either imino functional groups or methylol functional groups or a mixture thereof, wherein the sum of the imino functional groups and methylol functional groups must be at least 20 per- cent of the total available functional sites on the melamine formaldehyde;

(c) a metal catalyst which is incorporated to catalyze a reaction between the polyepoxide-amine adduct and the melamine formaldehyde; and wherein the ratio of the polyepoxide amine adduct to the melamine-formaldehyde crosslinker is 40/60 to 95/5 by weight of total resin solids, the metal catalyst is present in amounts of about 0.5 to 5.0 percent by weight of total resin solids, and the electrodepositable resin is capable of curing in a basic environment at a temperature in the range of 120°-150° C.

2. The cathodic electrodepositable resin of claim 1 wherein the polyepoxide amine adduct has primary hydroxyl groups.

3. The cathodic electrodepositable resin of claim 1, wherein the metal catalyst is a metal salt of organic acids or inorganic acids.

4. The cathodic electrodepositable resin of claim 3 wherein the metal catalyst is a metallic soap of monocarboxylic acids containing 7 to 22 carbon 5. The cathodic electrodepositable resin of claim 4 wherein the metal catalyst contains metals selected from the group consisting of Cobalt, Copper, Iron, and Lead.

6. The cathodic electrodepositable resin of claim 1 wherein the metal forms a coordination compound or complex with a Lewis base or ligand.

7. The cathodic electrodepositable resin of claim 6 wherein the metal complex is cobalt acetylacetonate.

8. The electrodepositable resin of claim 1 wherein the polyepoxide amine adduct is a polyglycidyl ether of polyhydric phenol with primary hydroxyl or secondary hydroxyl functionality.

9. A cathodic electrodepositable resin comprising:
(a) a polyepoxide amine adduct having primary or secondary hydroxyl groups;
(b) a urea-formaldehyde crosslinker; the urea-formaldehyde being substantially water insoluble and having either imino functional groups or methylol functional groups or a mixture thereof, wherein the sum of the imino functional groups and methylol functional groups must be at least 20 percent of the total available functional sites on the urea formaldehyde;
(c) a metal catalyst which is incorporated to catalyze a reaction between the polyepoxide-amine adduct and the urea-formaldehyde; and
wherein the ratio of the polyepoxide amine adduct to the urea-formaldehyde crosslinker is 40/60 to 95/5 by weight of total resin solids, the metal catalyst is present in amounts of about 0.5 to 5.0 percent by weight of total resin solids, and the electrodepositable resin is capable of curing in a basic environment at a temperature in the range of 120°-150° C.

10. The cathodic electrodepositable resin of claim 9 wherein the polyepoxide amine adduct has primary hydroxyl groups.

11. The cathodic electrodepositable resin of claim 9, wherein the metal catalyst is a metal salt of organic acids or inorganic acids.

12. The cathodic electrodepositable resin of claim 11 wherein the metal catalyst is a metallic soap of monocarboxylic acids containing 7 to 22 carbon atoms.

13. The cathodic electrodepositable resin of claim 12 wherein the metal catalyst contains metals selected from the group consisting of Cobalt, Copper, Iron, and Lead.

14. The cathodic electrodepositable resin of claim 9 wherein the metal forms a coordination compound or complex with a Lewis base or ligand.

15. The cathodic electrodepositable resin of claim 14 wherein the metal complex is cobalt acetylacetonate.

16. The electrodepositable resin of claim 9 wherein the polyepoxide amine adduct is a polyglycidyl ether of polyhydric phenol with primary hydroxyl or secondary hydroxyl functionality.

17. A cathodic electrodepositable resin comprising:
(a) a polyepoxide amine adduct having primary or secondary hydroxyl groups;
(b) a carboxyl modified aminoplast resin crosslinker; the carboxyl modified aminoplast resin being substantially water insoluble and having either imino functional groups or methylol functional groups or a mixture thereof, wherein the sum of the imino functional groups and methylol functional groups must be at least 20 percent of the total available functional sites on the carboxyl modified aminoplast resin;
(c) a metal catalyst which is incorporated to catalyze a reaction between the polepoxide-amine adduct and the carboxyl modified aminoplast resin; and
wherein the ratio of the polyepoxide amine adduct to the carboxyl modified aminoplast crosslinker is 40/60 to 95/5 by weight of total resin solids, the metal catalyst is present in amounts of about 0.5 to 5.0 percent by weight of total resin solids, and the electrodepositable resin is capable of curing in a basic environment at a temperature in the range of 120°-150° C.

18. The cathodic electrodepositable resin of claim 17 wherein the polyepoxide amine adduct has primary hydroxyl groups.

19. The cathodic electrodepositable resin of claim 17, wherein the metal catalyst is a metal salt of organic acids or inorganic acids.

20. The cathodic electrodepositable resin of claim 19 wherein the metal catalyst is a metallic soap of monocarboxylic acids containing 7 to 22 carbon atoms.

21. The cathodic electrodepositable resin of claim 20 wherein the metal catalyst contains metals selected from the group consisting of Cobalt, Copper, Iron, and Lead.

22. The cathodic electrodepositable resin of claim 17 wherein the metal forms a coordination compound or complex with a Lewis base or ligand.

23. The cathodic electrodepositable resin of claim 22 wherein the metal complex is cobalt acetylacetonate.

24. The electrodepositable resin of claim 17 wherein the polyepoxide amine adduct is a polyglycidlyl ether of polyhydric phenol with primary hydroxyl or secondary hydroxyl functionality.

25. A coating composition which can be applied in a variety of methods comprising;
(a) a polyepoxide amine adduct having primary or secondary hydroxyl groups;
(b) an aminoplast resin crosslinker; the aminoplast resin being substantially water insoluble and having either imino functional groups or methylol functional groups or a mixture thereof, wherein the sum of the imino functional groups and methylol functional groups must be at least 20 percent of the total available functional sites on the aminoplast resin;
(c) a metal catalyst which is incorporated to catalyze a reaction between the polepoxide-amine adduct and the aminoplast resin; and wherein the ratio of the polyepoxide amine adduct to the aminoplast crosslinker is 40/60 to 95/5 by weight of total resin solids, the metal catalyst is present in amounts of about 0.5 to 5.0 percent by weight of total resin solids, and the coating composition is capable of curing at a temperature in the range of 120°–150° C.

26. A method of electrocoating an electrically conductive surface serving as a cathode comprising passing an electric current between said cathode and an anode in electrical contact with an aqueous electrodepositable composition, wherein said electrodepositable composition comprises an aqueous dispersion of
   (a) a polyepoxide amine adduct having primary or secondary hydroxyl groups;
   (b) an aminoplast resin crosslinker; the aminoplast resin being substantially water insoluble and having either imino functional groups or methylol functional groups or a mixture thereof, wherein the sum of the imino functional groups and methylol functional groups must be at least 20 percent of the total available functional sites on the aminoplast resin;
   (c) a metal catalyst which is incorporated to catalyze a reaction between the polepoxide-amine adduct and the aminoplast resin; and wherein the ratio of the polyepoxide amine adduct to the aminoplast crosslinker is 40/60 to 95/5 by weight of total resin solids, the metal catalyst is present in amounts of about 0.5 to 5.0 percent by weight of total resin solids, and the coating composition is capable of curing in a basic environment at a temperature in the range of 120°–150° C.

* * * * *